US010466074B2

(12) United States Patent
Terajima

(10) Patent No.: US 10,466,074 B2
(45) Date of Patent: Nov. 5, 2019

(54) POSITION DETECTING DEVICE, LENS DRIVING DEVICE, CAMERA DEVICE, AND ELECTRONIC APPARATUS

(71) Applicant: New Shicoh Motor Co., Ltd., Zhejiang (CN)

(72) Inventor: Kokichi Terajima, Kanagawa (JP)

(73) Assignee: New Shicoh Motor Co., Ltd., Zhejiang (CN)

( * ) Notice: Subject to any disclaimer, the term of this patent is extended or adjusted under 35 U.S.C. 154(b) by 183 days.

(21) Appl. No.: 15/800,237

(22) Filed: Nov. 1, 2017

(65) Prior Publication Data
US 2018/0128649 A1 May 10, 2018

(30) Foreign Application Priority Data

Nov. 8, 2016 (CN) .......................... 2016 1 0980704

(51) Int. Cl.
*G02B 7/02* (2006.01)
*G01D 5/20* (2006.01)
*G02B 7/04* (2006.01)
*G03B 13/34* (2006.01)
*H02K 41/03* (2006.01)
*G02B 7/08* (2006.01)
*H02K 41/035* (2006.01)
*G03B 3/10* (2006.01)

(52) U.S. Cl.
CPC .............. *G01D 5/202* (2013.01); *G02B 7/04* (2013.01); *G02B 7/08* (2013.01); *G03B 3/10* (2013.01); *G03B 13/34* (2013.01); *H02K 41/031* (2013.01); *H02K 41/0356* (2013.01); *G03B 2205/0069* (2013.01)

(58) Field of Classification Search
CPC ....................................................... G01D 5/202
USPC ........................................................... 359/823
See application file for complete search history.

(56) References Cited

U.S. PATENT DOCUMENTS

2013/0039640 A1* 2/2013 Sekimoto ............. H04N 5/2257
396/55

FOREIGN PATENT DOCUMENTS

JP 2006-178362 7/2006

OTHER PUBLICATIONS

English language machine translation of JP 2006-178362.

* cited by examiner

*Primary Examiner* — James C. Jones
(74) *Attorney, Agent, or Firm* — Fildes & Outland, P.C.

(57) ABSTRACT

A position detecting device includes a coil and a conductive member. The coil is formed within a surface being directed so that an M direction orthogonal to an L direction which is the moving direction thereof coincides with the normal direction thereof and has a meander wiring part. The meander wiring part has turning sections formed at ends thereof and turning width parts extending from the both ends of each turning section. Each turning width part has straight section extending in parallel to each other. The conductive member confronts against the coil with a space therebetween in the M direction, an edge of the conductive member is configured to be confronted against the straight section of the meander wiring part and extended along the non-parallel direction with respect to the extending direction of the straight section and the L direction to traverse a plurality of straight sections.

14 Claims, 6 Drawing Sheets

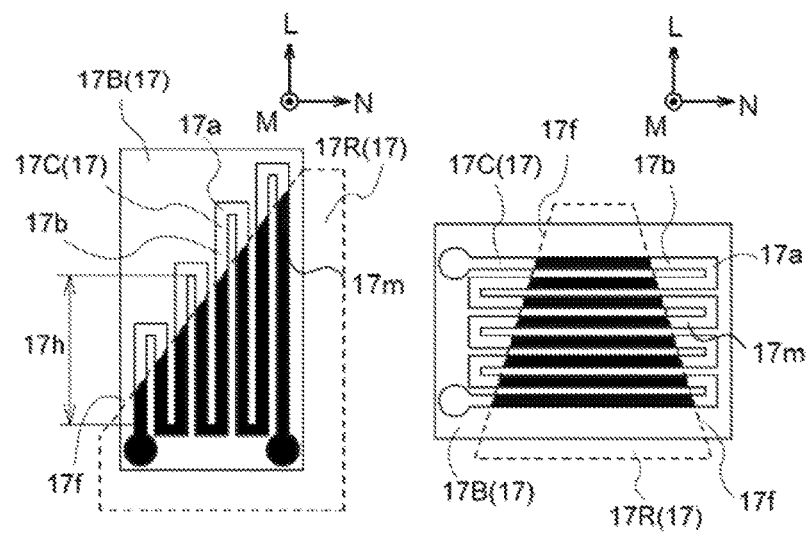
FIG. 2A
FIG. 2B
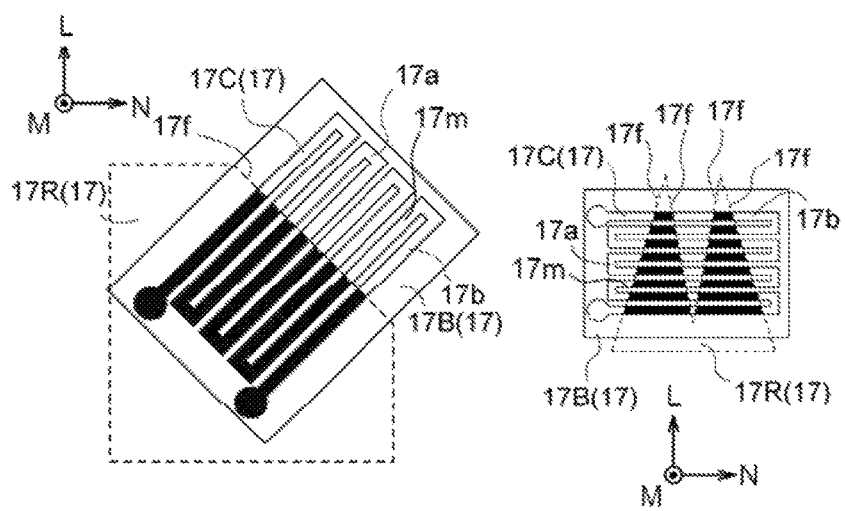
FIG. 2C
FIG. 2D

POSITION DETECTING DEVICE, LENS DRIVING DEVICE, CAMERA DEVICE, AND ELECTRONIC APPARATUS

TECHNICAL FIELD

This invention relates to a position detecting device, a lens driving device which is provided with the position detecting device, a camera device, and an electronic apparatus.

BACKGROUND ART

As an existing position detecting device, as Japanese Unexamined Patent Application Publication No. 2006-178362, A discloses, it is known that an optical device which holds a lens and is provided with a movable frame being movable along the optical axis of the lens is configured so that a printed circuit board being printed with a coil is arranged in parallel to the optical axis and a planar conductive member is arranged in a manner to confront against the printed circuit board. The conductive member is formed into a trapezoidal shape so that a width of the confronting surface thereof against the coil in the direction orthogonal to the optical axis direction can be changed in accordance with a position thereof with respect to the optical axis direction, thereby an inductance of the coil can be changed as the lens moves. According to the change of the inductance, a position of the lens can also be detected.

SUMMARY

Problems to be Solved by the Invention

However, when the coil and the conductive member relatively move toward each other and the edge of the conductive member reaches to a turning point of the innermost spiral section of the coil, the confronting area against the coil with relative to the moving amount can no longer be linearly changed. Thus, any of the following problems can be occurred: a positioning detection over a long distance cannot be carried out since a half dimension of the coil can only be used for the detection; the necessary area for the coil can be large since a half unused part for the detection of the coil is useless; and an accurate positioning detection cannot be carried out if the whole part of the coil is used.

This invention aims to provide a position detecting device which is of small size and can accurately detect a predetermined length, a lens driving device, a camera device, and an electronic apparatus.

Means for Solving the Problem

In one aspect of the present invention is a position detecting device. This position detecting device includes: a coil; and a conductive member; wherein the coil is attached to any one of a stator and a movable part which moves along the predetermined L direction with respect to the stator while the conductive member is attached to the other one of the stator and the movable part; the coil is formed within a surface being directed so that an M direction orthogonal to the L direction coincides with the normal direction thereof and has a meander wiring part; the meander wiring part has turning sections formed at ends thereof and turning width parts extending from the both ends of each turning section; each turning width part has straight section extending in parallel to each other; and the conductive member confronts against the coil with a predetermined space therebetween in the M direction, an edge of the conductive member is configured to be confronted against the straight section of the meander wiring part and extends along the non-parallel direction with respect to the extending direction of the straight section and the L direction to traverse a plurality of straight sections.

Preferably, the straight section extends along the same direction with the L direction, wherein the edge of the conductive member, with a movement of the movable part, confronts at the same position thereof against one of the plurality of straight sections.

Preferably, the straight section extends along a different direction from the L direction, and the edge of the conductive member extends straightly.

Preferably, the straight section extends along an N direction orthogonal to the L direction and the M direction; the conductive member has two edges traversing the plurality of straight sections; and a distance between the two edges along the N direction linearly changes with respect to the L direction.

Preferably, the two edges extend straightly and are not in parallel to each other.

Preferably, the turning sections are formed at both ends of the meander wiring part, wherein turning sections formed at at least one of the ends thereof do not confront against the conductive member.

Preferably, an arranged direction of a plurality of the turning sections which are not confronted against the conductive member is approximately in parallel to an extending direction of the edge of the conductive member.

Preferably, a varying inductance of the coil is detected whose inductance is changed by supplying an alternative current to the coil and thus generating an eddy current in the conductive member which confronts against the coil.

Another aspect of the present invention is a lens driving device. The lens driving device includes: a position detecting device according to the above aspect; wherein the movable part includes a lens holder for supporting a lens; the lens holder is configured that the optical axis direction of the lens is arranged in parallel to the L direction; the position detecting device detects a position along a direction parallel to the optical axis direction of the movable part.

Another aspect of the present invention is a lens driving device. The lens driving device includes: a position detecting device according to the above aspect; wherein the movable part includes a lens holder for supporting a lens; the lens holder is configured that the optical axis direction of the lens is arranged in parallel to the M direction; the position detecting device detects a position along a direction orthogonal to the optical axis direction of the movable part.

Another aspect of the present invention is a lens driving device. The lens driving device includes: two position detecting devices according to the above aspect; wherein the movable part includes a lens holder for supporting a lens; the lens holder is configured that the optical axis direction of the lens is arranged in parallel to the M direction; the two position detecting devices are arranged so that the L directions thereof are orthogonal to each other, and the two position detecting devices detect positions along directions which are orthogonal to the optical axis of the movable part and are orthogonal to each other.

Another aspect of the present invention is a camera device which includes a lens driving device of the above aspect; the lens; and a photo detecting sensor receiving light passed through the lens.

Another aspect of the present invention is an electronic apparatus which is equipped with the camera device of the above aspects.

Advantageous Effect

By forming a meander wiring part in the coil, the confronting area where the coil and the conductive member are confronted each other changes linearly in corresponding to the moving amount of the movable part. Thus, an inductance of the coil also changes linearly in corresponding to the moving amount of the movable part. As a result, the whole dimension of the coil can be effectively used for the detection, thereby obtaining a position detecting device which is of small size and can accurately detect a predetermined length.

The summary of the invention described above is not intended to list the whole features necessary to the present invention, but it should be also understood that any sub-combinations of the above features also can be included in the present invention.

BRIEF DESCRIPTION OF THE DRAWINGS

FIGS. 2A-D show plan views of examples of the position detecting device according to an embodiment of the present invention.

EXEMPLARY EMBODIMENT OF THE INVENTION

An embodiment for implementing the present invention will be described hereinafter. However, the following embodiment is not intended to limit the scope of the invention claimed in Claims, and it is not necessarily that all the features described in the following embodiment are needed for the means to solve the problem of the invention.

Figure 1A:
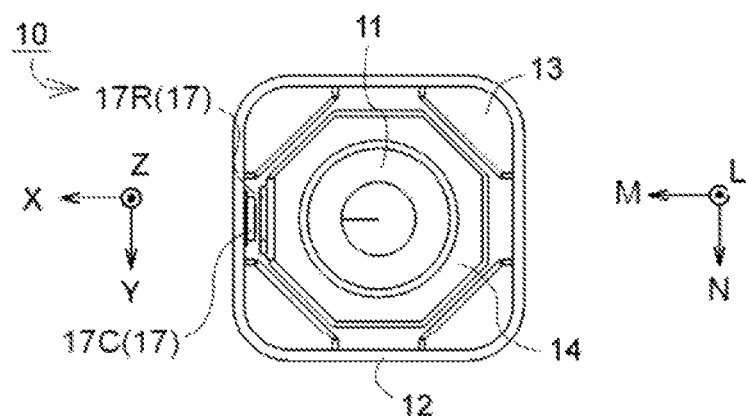
FIG. 1A shows a plan view of a lens driving device which installs a position detecting device according to an embodiment of the present invention.
Figure 1B:
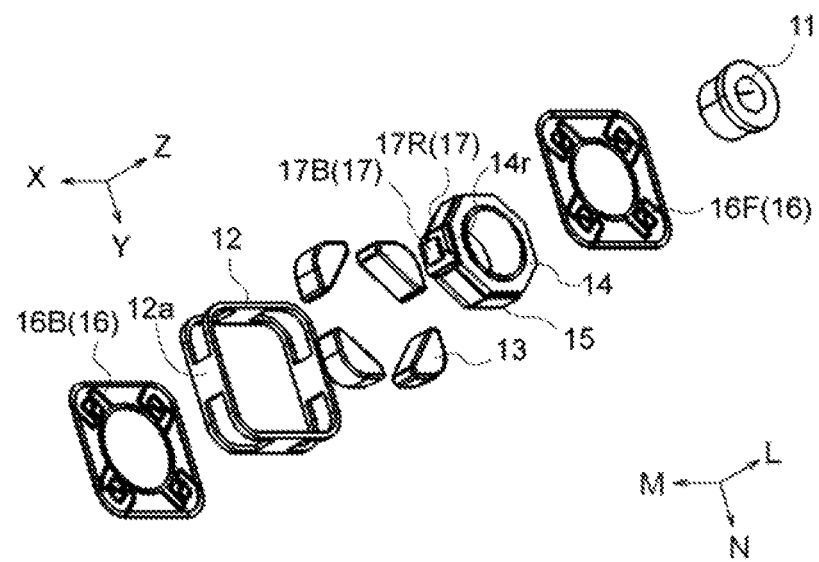
FIG. 1B shows an exploded perspective view of the lens driving device of FIG. 1A.

FIG. 1A shows a plan view showing an appearance of a main part of a lens driving device 10 which installs a position detecting device 17 according to the present embodiment. FIG. 1B shows an exploded perspective view thereof. FIGS. 2A to 2D show plan views of a position detecting coil (hereinafter, it is simply referred to as "coil") 17C and position detecting conductive members (hereinafter, it is referred to as "conductive member") 17R which are provided in the position detecting device 17.

The lens driving device 10, a lens 11, and a light receiving sensor which receives light through the lens 11 constitute a camera device. The camera device is installed in electronic apparatuses such as cellular phones and smart phones.

The lens driving device 10, in an overall shape, has a rectangular parallelepiped shape as shown in FIG. 1A in which plate-like spring members 16 are omitted. A lens holder 14 has an octagonal tubular shape being directed toward a Z direction and has a circular hollow space in the center thereof for holding the lens 11. Now, the optical axis direction of the lens 11 is regarded as the Z direction while the remaining two directions orthogonal to the Z direction are regarded as an X direction and a Y direction. In the Z direction, a side including an imaging target is referred to as a "front side" while the opposite side including the light receiving sensor which is not shown is referred to as a "rear side".

The lens driving device 10 includes four magnet pieces 13, the lens holder 14, a focusing coil 15, and plate-like spring members 16 as shown in FIG. 1B. Each magnet piece 13 has an approximately triangular shape and is attached to every corner of magnetic holder 12 having a rectangular frame shape. The focusing coil 15 is attached to the lens holder 14 in a manner to be wound around the outer perimeter of the lens holder 14 with regard to the Z direction as an axis, thereby is used as a driving coil for driving the lens holder 14. The plate-like spring members 16 have a front side plate-like spring member 16F and a back side plate-like spring member 16B which suspend and support the lens holder 14 therebetween so that the lens holder 14 can freely move along the Z direction. The front side plate-like spring member 16F supports the lens holder 14 at the front side while the back side plate-like spring member 16B supports the lens holder at the back side.

In the lens driving device 10, the magnetic holder 12 and the magnet pieces 13 are regarded as a stator while the lens holder 14 and the focusing coil 15 are regarded as a movable part. The movable part can move with respect to the stator along the Z direction which corresponds to the optical axis direction of the lens 11.

The position detecting device 17 includes the coil 17C and the conductive member 17R as shown in FIGS. 1A, 1B, and FIG. 2A. The coil 17C is formed onto a substrate surface of a printed circuit board 17B. The conductive member 17R is formed from a plate-like conductive material. The position detecting device 17 is configured so that the plate surface of the coil 17C formed on the printed circuit board 17B and the plate surface of the conductive member 17R are confronted each other.

The printed circuit board 17B of rectangular plate shape on which the coil 17C is formed is attached to the inner surface of the frame surface 12a of the magnetic holder 12. One of the side surfaces of the octagonal tubular shape of the lens holder 14 is provided with a mounting portion for the conductive member 14r. The mounting portion for the conductive member 14r is provided so that it protrudes outward with respect to the radial direction of the focusing coil 15 at the front side and the back side of the Z direction. The conductive member 17R is attached to the mounting portion for the conductive member 14r from the outer side of the focusing coil 15. The conductive member 17R has a pentagonal plate shape having an edge 17f which is obliquely cut at one side thereof.

Now, the position detecting device 17 will be described using an L-M-N three dimensional coordinate system as well as the above X-Y-Z three dimensional coordinate system. Here, moving direction of the movable part is defined as an L direction. In the lens driving device 10, the lens 11 moves along the Z direction which is the optical axis direction thereof; and the Z direction coincides with the L direction. Also, an M direction is defined as a direction orthogonal to the L direction, an N direction is defined as the direction orthogonal to both the L direction and M direction; thus the M direction coincides with the X direction while the N direction coincides with the Y direction.

The plate surface of the printed circuit board 17B is directed so that the M direction coincides with the normal direction thereof, and the coil 17C has a meander wiring part 17m which is wired in an meandering manner as shown in FIGS. 2A to 2D. The meander wiring part 17m has turning sections 17a formed at ends thereof and turning width parts 17b each of which extends from the both ends of each turning section 17a. Each turning width part 17b of the coil 17C of the present embodiment has a straight section 17b, and the straight sections 17b are arranged in parallel to each other.

In the meander wiring part 17m shown in FIG. 2A, a plurality of turning sections 17a is arranged at the both ends along the L direction toward the N direction, and the turning width parts 17h are formed so that they connects the turning sections 17a at the both ends. Thus, the coil 17C wired in a meandering manner is formed so that the conductive pattern is arranged in a zigzag shape. The straight sections 17b extending along the L direction and being in parallel to each other are alternatively arranged. Therefore, the straight sections 17b of the meander wiring part 17m in the coil 17C shown in FIG. 2A extend in parallel to the L direction. In the meander wiring part 17m of the coil 17C shown in FIG. 2A, the length of the straight sections 17b is varied in accordance with a frequent occurrence of the straight sections 17b. An alternate electric current such as of several hundred kHz is provided to the coil 17C.

The conductive member 17R, in order to be in parallel to the coil 17C, is arranged so that the M direction coincides with the normal direction thereof as shown in FIGS. 2A to 2D. That is to say, the coil 17C and the conductive member 17R are arranged so that their plate surfaces are in parallel to each other. One part of the coil 17C (blacked out part) confronts against the conductive member 17R with a space therebetween in the M direction while the remaining part of the coil 17C (white-painted part) does not confront against the conductive member 17R. Viewing from the M direction, the edge 17f is located at the position confronting against the straight sections 17b of the coil 17C, extends into a direction not in parallel to the extending direction of the straight sections 17b and the L direction, and traverses the plurality of straight sections 17b. Further, the conductive member 17R confronts against the inner side, by the edge 17f, of the straight sections 17b of the coil 17C but does not confront against the section out of the edge 17f, of the straight sections 17b and the turning sections 17a.

When electric current flows through the coil 17C, an inductive magnetic field is generated around the coil 17C while an eddy current is generated in the conductive member 17R confronting the coil 17C so that it cancels the inductive magnetic field, thus a reflective magnetic field is generated from the conductive member 17R. By means of the reflective magnetic field, an inductance of the coil 17C which can be changed can be detected. Therefore, the coil 17C can be regarded as an eddy current inducing coil while the conductive member 17R can be regarded as an eddy current reflecting member.

When a predetermined voltage is applied to the focusing coil 15 for supplying electricity, a Lorentz force being directed toward the Z direction is generated in the focusing coil 15; thus, the lens holder 14 is moved toward the Z direction or L direction with keeping a balance with a restoring force of the plate-like spring members 16.

As the conductive member 17R attached to the lens holder 14 proceeds or regresses (moves) along the L direction in accordance with the movement of the lens holder 14, the edge 17f of the conductive member 17R also moves along the L direction. Thus, the confronting area where the coil 17C and the conductive member 17R are confronted each other increases and decreases linearly in corresponding to the moving amount of the lens holder 14. As a result, since the reflective magnetic field generated from the conductive member 17R increases or decreases, an inductance of the coil 17C also increases or decreases linearly in corresponding to the moving amount of the lens holder 14.

In the meander wiring part 17m, since the turning sections 17a are arranged at ends along the L direction, and the straight sections 17b can be formed right before the turning sections 17a, the whole dimension of the coil 17C can be effectively used for the detection, thereby obtaining a position detecting device 17 which is of small size and can accurately detect a predetermined length.

As a result, by measuring an inductance value of the coil 17C, moving amount of the lens holder 14 with respect to the L direction can be accurately detected. Therefore, the lens 11 can be moved to an accurate position along the optical axis direction for being focused on an imaging target since an amount of power supply through the focusing coil 15 is increased or decreased by being feedback controlled so that the inductance of the coil 17C is kept to a constant value.

In FIG. 2A, the edge 17f is illustrated so that it extends straightly. However, if the straight sections 17b extend toward the same direction with the L direction, since the same part of the edge 17f is constantly confronted against the straight sections 17b, the edge 17f is not necessarily to be a straight fashion.

Further, in FIG. 2A, an arranged direction of the plurality of the turning sections 17a which are not confronted against the conductive member 17R is approximately in parallel to the extending direction of the edge 17f of the conductive member 17R. Therefore, the dimension of the coil 17C can be reduced since the needed area for the straight sections 17b can be reduced.

In the present embodiment, the coil 17C is attached to the stator while the conductive member 17R is attached to the movable part. However, they also can be attached to the other one of members (the coil 17C can be attached to the movable part while the conductive member 17R can be attached to the stator). This can be equally applied to the following embodiments described hereinafter.

Other embodiments regarding the coil 17C and the conductive member 17R constituting the position detecting device 17 now will be described with reference to FIGS. 2B to 2D. The coil 17C in the position detecting device 17 shown in FIG. 2B includes a meander wiring part 17m formed on the printed circuit board 17B so that the turning sections 17a formed at both ends thereof in the N direction and the straight sections 17b connecting the turning sections 17a at the both ends and extending along the N direction are alternatively arranged. Thus, the extending direction of the straight sections 17b of the meander wiring part 17m in the coil 17C shown in FIG. 2B is directed at a right angle to the L direction.

The conductive member 17R is formed into a trapezoidal plate shape. On part of the coil 17C (blocked out part) confronts against the conductive member 17R with a space therebetween while the remaining part of the coil 17C (white-painted part) does not confront against the conductive member 17R. Viewing from the M direction, the two edges 17f corresponding to the legs (or lateral sides) of the trapezoid are located at the positions confronting against the straight sections 17b of the coil 17C; thus, the conductive member 17R confronts against the inner side, by the edges 17f, of the straight sections 17b of the coil 17C but does not confront against the sections out of the edges 17f of the straight sections 17b and the turning sections 17a located at the both ends.

In the case that the position detecting device 17 according to the present alternative embodiment is employed, the confronting area where the coil 17C and the conductive member 17R are confronted each other increases and decreases linearly in corresponding to the moving amount of the lens holder 14 in accordance with the movement of the lens holder 14 along the L direction. Since the edges 17f do not confront against the turning sections 17a when the conductive member 17R moves, the confronting area against the coil 17C with relative to the moving amount can be linearly changed, thus an inductance of the coil 17C can be linearly changed, accurately reflecting the moving amount of the lens holder 14.

Even if the lens holder 14 moves toward the N direction, the inductance does not change since the confronting area is not changed. Therefore, this configuration is effective for the usage in which the movement along the L direction only should be detected but the movement along the N direction should not be detected.

The outline of the conductive member 17R is not limited to a trapezoid shape but can employ any other shapes as long as meeting the requirement in that the edges 17f confront against the straight sections 17b but do not confront against the turning sections 17a. For example, triangular shape can also be employed for the conductive member 17R.

If the distance along the N direction between the two edges 17f is configured to be linearly varied with respect to the L direction, the confronting area where the coil 17C and the conductive member 17R are confronted each other increases and decreases linearly in corresponding to the moving amount of the lens holder 14. Hence, the straight two edges 17f need not be arranged to be line symmetric. Further, in this case, the two edges 17f are not necessarily to be a straight fashion. For example, two arch edges 17f having convexed arch, concave arch, or a combination thereof also can be employed for the conductive member 17R. Besides, three or more edges 17f can also be employed for the conductive member 17R as shown in FIG. 2D.

The coil 17C in the position detecting device 17 shown in FIG. 2C is the one rotating the coil 17C shown in FIG. 2B by 45 degree about the M axis.

The conductive member 17R is formed into a substantially pentagonal shape by chamfering one of the corners of a rectangular plate at 45 degree. One part of the coil 17C (blacked out part) confronts against the conductive member 17R with a space therebetween while the remaining part of the coil 17C (white-painted part) does not confront against the conductive member 17R. The edge 17f extends at right angle to the extending direction of the straight sections 17b. Viewing from the M direction, the edge 17f corresponding to the chamfered section is located at the positions confronting against the straight sections 17b of the coil 17C; thus, the conductive member 17R confronts against the inner side, by the edge 17f, of the straight sections 17b of the coil 17C but does not confront against the sections out of the edge 17f of the straight sections 17b and the turning section 17a located out of the edge 17f. In the position detecting device 17 shown in FIG. 2C, changing amount of the confronting area can be constant in any case when the movable part moves toward the direction L or the direction N as long as the moving amount with respect to the both directions is the same value. Thus, according to the position detecting device 17 of this alternative embodiment, both the moving amount along the L direction and the moving amount along the N direction are equally detected.

In the case that the position detecting device 17 according to the present alternative embodiment is employed, the confronting area where the coil 17C and the conductive member 17R are confronted each other increases and decreases linearly in corresponding to the moving amount of the lens holder 14 in accordance with the movement of the lens holder 14 along the L direction. Since the edges 17f do not confront against the turning sections 17a when the conductive member 17R moves, the confronting area against the coil 17C with relative to the moving amount can be linearly changed, thus an inductance of the coil 17C can be linearly changed, accurately reflecting the moving amount of the lens holder 14.

In the case that the extending direction of the straight sections 17b, the L direction, and the extending direction of the edge(s) 17f are different from each other, the confronting area with relative to the moving amount can be linearly changed if the edge(s) 17f of the conductive member 17R is (are) formed into a straight line(s) traversing the plurality of straight sections 17b.

In the meander wiring part 17m, the part of the turning width parts 17h constantly confronting against the conductive member 17R regardless of the movement of the movable part is not necessarily to be formed as straight lines. For example, curved shape can also be employed for the above-mentioned part. In the lens driving device 10 shown in FIGS. 1A, 1B, any of the position detecting device 17 shown in FIGS. 2A to 2O according to the embodiments can be installed thereto.

Figure 3A:
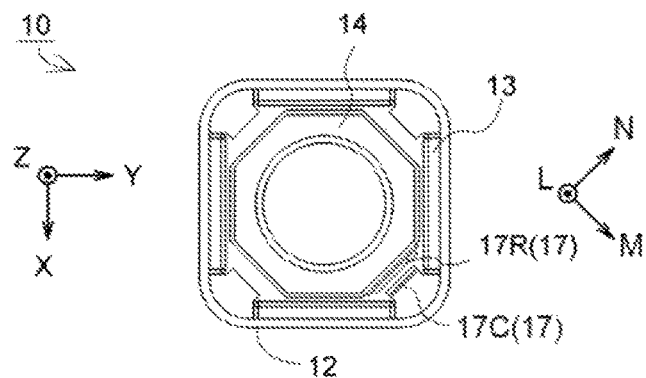
FIG. 3A shows a plan view of a lens driving device which installs a position detecting device of another example according to an embodiment of the present invention.
Figure 3B:
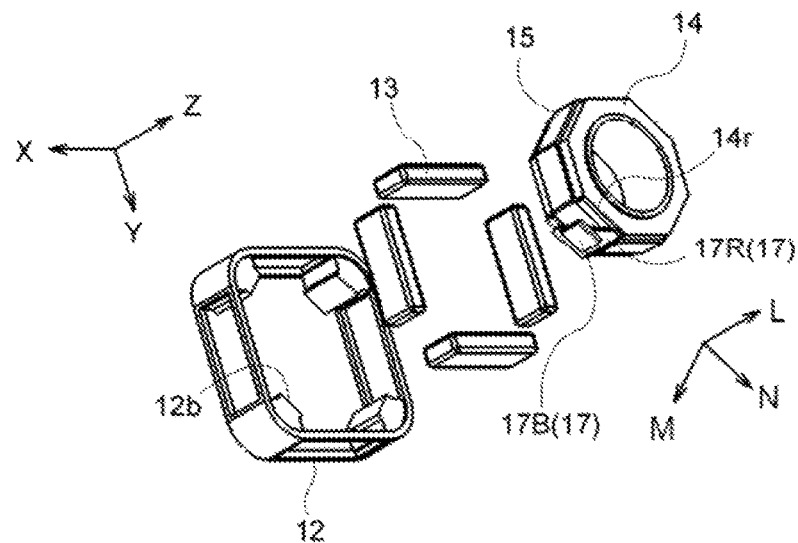
FIG. 3B shows an exploded perspective view of the lens driving device of FIG. 3A.

FIG. 3A shows a plan view showing an appearance of a lens driving device 10 according to an alternative embodiment which installs a position detecting device 17 according to the present embodiment. FIG. 3B shows an exploded perspective view of a main part thereof. The same parts with the above mentioned embodiment shown in FIGS. 1A, 1B are omitted in FIGS. 3A and 3B.

The lens driving device 10, in an overall shape, has a rectangular parallelepiped shape as shown in FIG. 3A in which plate-like spring members 16 are omitted. A lens holder 14 has an octagonal tubular shape being directed toward the Z direction and has a circular hollow space in the center thereof for holding the lens (not shown). The lens driving device 10 includes four magnet pieces 13, the lens holder 14, a focusing coil 15, and spring members (not shown) as shown in FIG. 3B.

Each magnet piece 13 has a rectangular parallelepiped shape and is attached to every four side of a magnetic holder 12 having a rectangular frame shape. The focusing coil 15 is attached to the lens holder 14 in a manner to be wound around the outer perimeter of the lens holder 14 with respect to the Z direction as an axis, thereby is used as a driving coil. The spring members suspend and support the lens holder 14 therebetween so that the lens holder 14 can freely move forward or backward along the Z direction.

In the lens driving device 10, the magnetic holder 12 and the magnet pieces 13 are regarded as a stator while the lens holder 14 and the focusing coil 15 are regarded as a movable part. The movable part can move with respect to the stator along the Z direction which corresponds to the optical axis direction of the lens 11.

A printed circuit board 17B of rectangular shape is attached to the inside of a corner 12b of the magnetic holder 12 and a coil 17C constituting one part of the position detecting device 17 is formed onto the printed circuit board 17B. One of the side surfaces of the octagonal tubular shape of the lens holder 14 is provided with a mounting portion for the conductive member 14r. The mounting portion for the conductive member 14r is provided so that it protrudes outward with respect to the radial direction of the focusing coil 15 at the front side and the back side of the Z direction. The conductive member 17R which constitutes the other one part of the position detecting device 17 is attached to the mounting portion for the conductive member 14r from the outer side of the focusing coil 15. The conductive member 17R has a pentagonal plate shape having an edge 17f which is obliquely cut at one side thereof.

In the lens driving device 10, the lens (not shown) moves along the Z direction which is the optical axis direction thereof; and the Z direction coincides with the L direction. The X direction is the direction rotated about the L axis at 45 degree from the M direction while the Y direction is the direction rotated about the L axis at 45 degree from the N direction. As the position detecting device 17, the position detecting device 17 shown in FIG. 2A is employed. However, any position detecting device 17 disclosed in the embodiments can also be employed.

When a predetermined voltage is applied to the focusing coil 15 for supplying electricity, a Lorentz force being directed toward the L direction (Z direction) is generated in the focusing coil 15; thus, the lens holder 14 is moved toward the Z direction or L direction with keeping a balance with a restoring force of the spring members (not shown).

As the lens holder 14 moves toward the L direction, the confronting area where the coil 17C and the conductive member 17R are confronted each other increases and decreases linearly in corresponding to the moving amount of the lens holder 14 as described above. Thus, the position detecting device 17 which is of small size and can accurately detect a predetermined length can be obtained.

Therefore, the lens 11 can be moved to an accurate position along the optical axis direction for being focused on an imaging target since an amount of power supply through the focusing coil 15 is increased or decreased by being feedback controlled so that the inductance of the coil 17C is kept to a constant value.

In the lens driving device 10 shown in FIGS. 1B and 3B, the magnetic holder 12 is formed with through-holes at the side surfaces thereof, and the magnet pieces 13 are configured to be fitted within these through-holes. It can also be possible that the through-holes are not provided therewith but the magnet pieces 13 are attached inner side surfaces of the magnetic holder 12. In this case, the magnetic holder 12 can also be formed of a magnetic material thereby being used as a magnetic yoke.

Figure 4A:
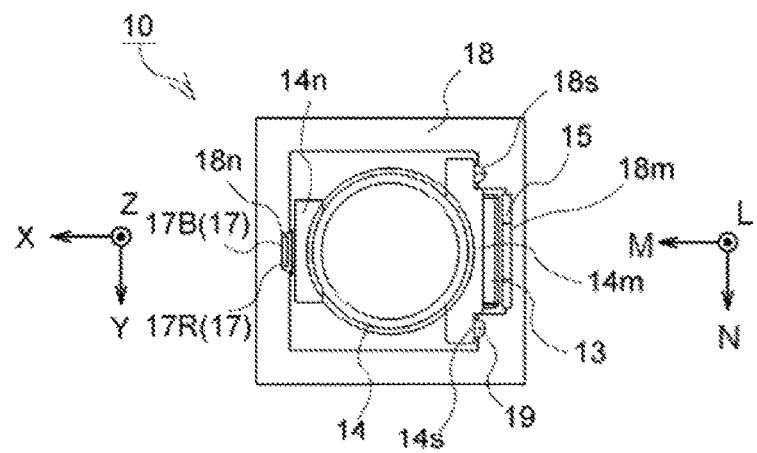
FIG. 4A shows a plan view of a lens driving device which installs a position detecting device of another example according to an embodiment of the present invention.
Figure 4B:
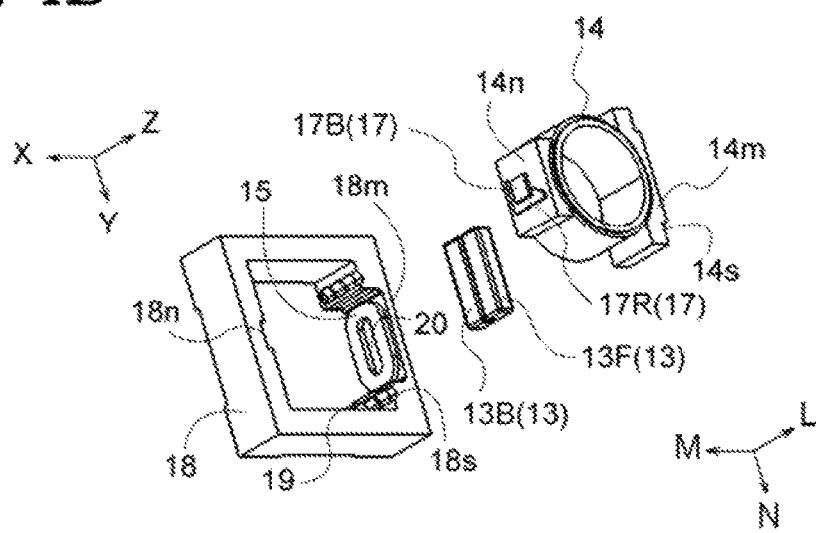
FIG. 4B shows an exploded perspective view of the lens driving device of FIG. 3A.

FIG. 4A shows a plan view showing an appearance of a lens driving device 10 according to an alternative embodiment which installs a position detecting device 17 according to the present embodiment. FIG. 4B shows an exploded perspective view thereof. The lens driving device 10 includes a lens holder 14, magnet pieces 13, a focusing coil 15, a base frame 18, and a position detecting device 17. The lens holder 14 has a tubular shape which opens toward the optical axis direction of a lens (not shown), and is used for holding the lens within the tube so that it can freely move along the optical axis direction of the lens. The position detecting device 17 detects moving amount of the lens holder 14 along the optical axis direction. Now, the optical axis direction of the lens is regarded as a Z direction and the moving direction thereof is regarded as an L direction. The Z direction coincides with the L direction. The two directions orthogonal to the Z direction are regarded as an X direction and a Y direction; thus an M direction coincides with the X direction while an N direction coincide with the Y direction.

The lens holder 14 is provided with a driving member attached part 14m at an outer side surface thereof and to which the magnet pieces 13 constituting one of driving members are attached. The base frame 18 is provide with a driving member attached part 18m at an inner side surface thereof and to which the focusing coil 15 constituting the other one of the driving members are attached. The magnet pieces 13 and the focusing coil 15 are confronted to each other with a space therebetween in the X direction (M direction). The focusing coil 15 is wound with regard to the X direction as its axis. The magnet pieces 13 include a front side magnet piece 13F and a back side magnet piece 13B; and thus different magnetic pole surfaces each having one of magnetic poles confront against the front side and the back side of the focusing coil 15.

The lens holder 14 is provided with holder side guide grooves 14s extending along the Z direction at the both sides of the driving member attached part 14m in the Y direction while the base frame 18 is provided with frame side guide grooves 18s extending along the Z direction at the both sides of the driving member attached part 18m in the Y direction. Spherical members 19 are inserted between the holder side guide grooves 14s and the frame side guide grooves 18s. Since a magnetic yoke 20 is attached to the base frame 18 at the back surface of the focusing coil 15, the lens holder 14 and the base frame 18 are drawn to each other due to an attractive force between the magnet pieces 13 and the magnetic yoke 20. Thus, the spherical members 19 are sandwiched by the holder side guide grooves 14s and the frame side guide grooves 18s, and therefore, the lens holder 14 can slidingly move along the Z direction.

The lens holder 14 is provided with a position detecting device attached part 14n at a side surface opposite to the driving member attached part 14m while the base frame 18 is provided with a position detecting device attached part 18n at an inner side surface opposite to the driving member attached part 18m. As the position detecting device 17, the one shown in FIG. 2A can be employed. However, any position detecting device 17 disclosed in the embodiments can also be employed. A conductive member 17R of the position detecting device 17 is attached to the position detecting device attached part 14n of the lens holder 14 while a printed circuit board 171B on which a coil 17C is formed is attached to the position detecting device attached part 18n of the base frame 18. The surface of the printed circuit board 17B is directed so that the M direction coincides with the normal direction thereof.

When a predetermined voltage is applied to the focusing coil 15 for supplying electricity, a Lorentz force being directed toward the L direction (Z direction) is generated in the focusing coil 15; thus, the lens holder 14 is moved toward the Z direction or L direction with keeping a balance with the attractive force between the magnet pieces 13 and the magnetic yoke 20.

The conductive member 17R attached to the lens holder 14 moves along the L direction in accordance with the movement of the lens holder 14, and the edge 17f of the conductive member 17R also moves along the L direction. Thus, as mentioned above, the confronting area where the coil 17C and the conductive member 17R are confronted each other increases and decreases linearly in corresponding to the moving amount of the lens holder 14. Thus, the position detecting device 17 which is of small size and can accurately detect a predetermined length can be obtained.

Therefore, the lens 11 can be moved to an accurate position along the optical axis direction for being focused on an imaging target since an amount of power supply through the focusing coil 15 is increased or decreased by being feedback controlled so that the inductance of the coil 17C is kept to a constant value.

Figure 5:
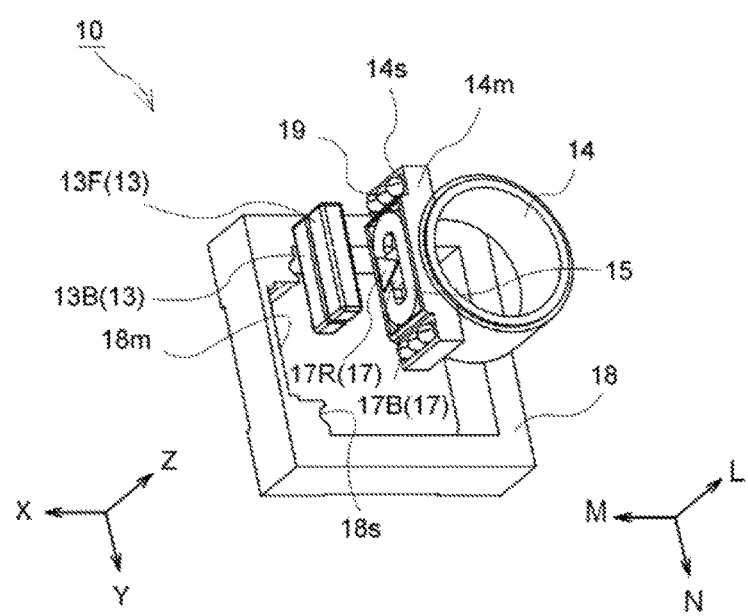
FIG. 5 shows an exploded perspective view of a lens driving device which installs a position detecting device of another example according to an embodiment of the present invention.

FIG. 5 shows an exploded perspective view of a lens driving device which installs a position detecting device of another example according to an embodiment of the present invention. The device of the present example is different from the one in the above mentioned embodiment in that magnet pieces 13 are attached to a driving member attached part 14m of a lens holder 14 while a focusing coil 15 is attached to a driving member attached part 18m of a base frame 18. Further, a magnetic yoke (not shown) is attached to a back surface of the focusing coil 15. Thus, the lens holder 14 and the base frame 18 are drawn to each other due to an attractive force between the magnetic pieces 13 and the magnetic yoke with a state that guide grooves 14s and guide grooves 18s interpose spherical members 19 therebetween.

As a position detecting device 17, the one shown in FIG. 2A can be employed. A printed circuit board 17B of the position detecting device 17 is attached to an internal circumference of the winging of the focusing coil 15 attached to the lens holder 14. The printed circuit board 17B is formed with a coil 17C. Further, a conductive member 17R is attached to magnetic pole surfaces of the magnet pieces 13 which are attached to the base frame 18. The surface of the printed circuit board 17B is directed so that the M direction coincides with the normal direction thereof, and the coil 17C has a meander wiring part 17m formed on the surface of the printed circuit board 17B.

When a predetermined voltage is applied to the focusing coil 15 for supplying electricity, a Lorentz force being directed toward the L direction (Z direction) is generated in the focusing coil 15; thus, the lens holder 14 is moved toward the Z direction or L direction with keeping a balance with the attractive force between the magnet pieces 13 and the magnetic yoke.

Since the coil 17C attached to the lens holder 14 moves along the L direction in accordance with the movement of the lens holder 14, thus the conductive member 17R attached to the base frame 18 relatively moves toward the opposite L direction to the moving direction of the coil 17C. The edge 17f of the conductive member 17R accordingly moves toward the opposite L direction. Thus, the confronting area where the coil 17C and the conductive member 17R are confronted each other increases and decreases linearly in corresponding to the moving amount of the lens holder 14. Thus, the position detecting device 17 which is of small size and can accurately detect a predetermined length can be obtained.

Therefore, the lens 11 can be moved to an accurate position along the optical axis direction for being focused on an imaging target since an amount of power supply through the focusing coil 15 is increased or decreased by being feedback controlled so that the inductance of the coil 17C is kept to a constant value.

Figure 6A:
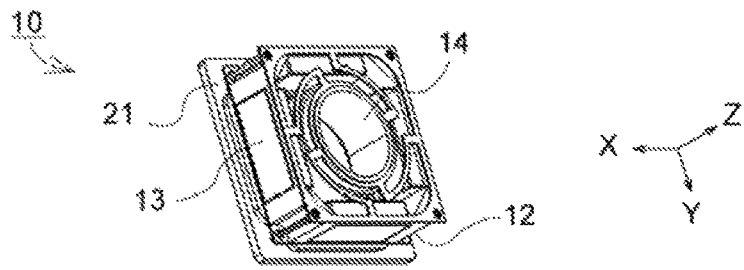
FIG. 6A shows a perspective view of a lens driving device which installs a position detecting device of another example according to an embodiment of the present invention.
Figure 6B:
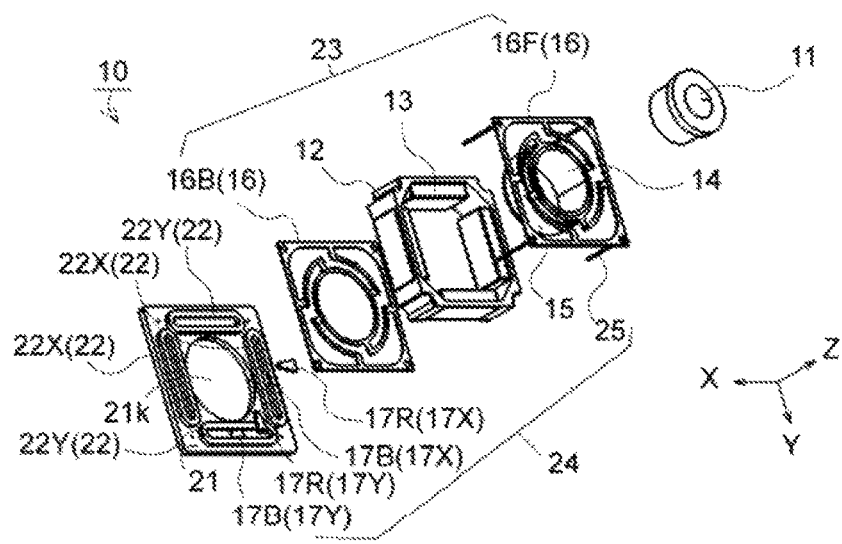
FIG. 6B shows an exploded perspective view of the lens driving device of FIG. 6A.
Figure 6C:
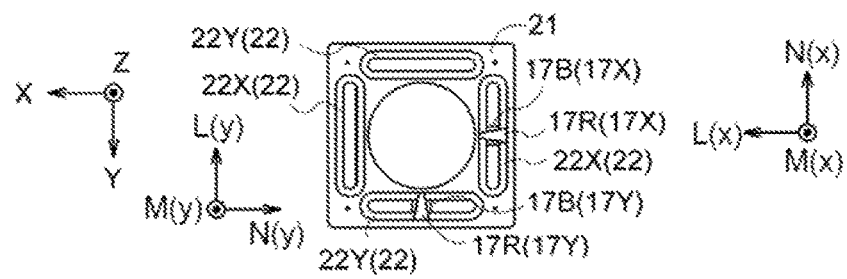
FIG. 6C shows a plan view of a main part regarding the lens driving device explaining how to install the position detecting device.

FIG. 6A shows a perspective view showing an appearance of a lens driving device to which a position detecting device 17 of another example according to an embodiment of the present invention attaches. FIG. 6B shows an exploded perspective view thereof. FIG. 6C shows a plan view of a main part regarding the lens driving device explaining how to install the position detecting device.

The lens driving device 10, in an overall shape, has a rectangular parallelepiped shape and includes a focusing unit 23 and a swaying unit 24. The focusing unit 23 causes a tubular lens holder 14 directing a Z direction being coincided with the optical axis direction to move along the Z direction. The lens holder 14 has a circular hollow space in the center thereof for holding a lens 11. The swaying unit 24 supports the focusing unit 23 so that the focusing unit 23 can be swayed in an X and Y directions.

The focusing unit 23 includes four magnet pieces 13, the lens holder 14, a focusing coil 15, and plate-like spring members 16. Each of four magnetic pieces has a rectangular parallelepiped shape and is attached to every four side of a magnetic holder 12 having a rectangular frame shape. The focusing coil 15 is used as a driving coil, and is attached to the lens holder 14 in a manner to be wound around the outer perimeter of the lens holder 14 with regard to the Z direction as an axis. The plate-like spring members 16 have a front side plate-like spring member 16F and a back side plate-like spring member 16B which suspend and support the lens holder 14 therebetween so that the lens holder 14 can freely move along the Z direction. The front side plate-like spring member 16F supports the lens holder 14 at the front side while the back side plate-like spring member 16B supports the lens holder at the back side. In this embodiment shown in FIGS. 6A to 6C, the position detecting device 17 is not provided on the focusing unit 23. However, it can also be possible that the position detecting device 17 for detecting the position of the lens holder 14 is provided on the focusing unit 23.

The swaying unit 24 includes a base plate 21, swaying coils 22, and four wire spring members 25. The base plate 21 is arranged at the back side of the focusing unit 23 and is formed with a circular opening 21k at the center thereof.

The swaying coils 22 are driving coils and have X-side swaying coils 22X and Y-side swaying coils 22Y, each of which swaying coil is wound around the Z direction as its axis. Each X-side swaying coil 22X has an elongated round shape (rectangular with rounded corners) extending along the Y direction and is arranged and attached on the plate surface of the base plate 21 at both outer sides of the opening 21k in the X direction. Each Y-side swaying coil 22Y has an elongated round shape (rectangular with rounded corners) extending along the X direction and is arranged and attached on the plate surface of the base plate 21 at both outer sides of the opening 21k in the Y direction. The X-side swaying coils 22X and the Y-side swaying coils 22Y confront against side surfaces of the magnet pieces 13, which side surfaces being directed toward the back side with respect to the Z direction, with a space therebetween in the Z direction.

Each of the four wire spring member 25 extends along the Z direction. Each front end of the wire spring members 25 in the Z direction is connected to every four corner of the front side plate-like spring member 16F while each back end of the wire spring members 25 in the Z direction is connected to every four corner of the base plate 21, thus the wire spring members 25 support the focusing unit 23 so that it can sway in the X and Y directions.

The focusing unit 23 works as follows: When a predetermined voltage is applied to the focusing coil 15 for supplying electricity, a Lorentz force being directed toward the Z direction is generated in the focusing coil 15; thus, the lens holder 14 is moved toward the Z direction with keeping a balance with a restoring force of the plate-like spring members 16. Thus, in the focusing unit 23, the magnetic holder 12 and the magnet pieces 13 are regarded as a stator while the lens holder 14 and the focusing coil 15 are regarded as a movable part. The movable part can move with respect to the stator along the Z direction which corresponds to the optical axis direction of the lens 11.

The swaying unit 24 works as follows: When a predetermined voltage is applied to the X-side swaying coils 22X for supplying electricity, a Lorentz force being directed toward the X direction is generated in the X-side swaying coils 22X. As a result, the magnet pieces 13 confronting against the X-side swaying coils 22X generate a reactive force being directed toward the X direction; thus, the lens holder 14 supported by the magnetic holder 12 sways toward the X direction with keeping a balance with a restoring force of the wire spring members 25. When a predetermined voltage is applied to the Y-side swaying coils 22Y for supplying electricity, a Lorentz force directing the Y direction is generated in the Y-side swaying coils 22Y. As a result, the magnet pieces 13 confronting against the Y-side swaying coils 22Y generate a reactive force being directed toward the Y direction; thus, the lens holder 14 supported by the magnetic holder 12 sways toward the Y direction with keeping a balance with a restoring force of the wire spring members 25.

Thus, in the swaying unit 24, the base plate 21 and the swaying coils 22 are regarded as a stator while the whole focusing unit 23 is regarded as a movable part. The movable part includes the lens holder 14, the magnetic holder 12, the magnet pieces 13, the focusing coil 15, and the plate-like spring members 16.

In the swaying unit 24, if the swaying unit 24 is swayed toward the X direction, the moving direction of the movable part is the X direction; thus the moving direction thereof is regarded as an L (X) direction. Similarly, if the swaying unit 24 is swayed toward the Y direction, the moving direction of the movable part is the Y direction; thus the moving direction thereof is regarded as an L (Y) direction.

It is preferable that a position detecting device 17X for the L (X) direction and a position detecting device 17Y for the L (Y) direction shown in FIG. 2B are employed as the position detecting devices 17 for the both directions. A coil 17C of the position detecting device 17X is formed on the printed circuit board 17B whose plate surface is directed toward the Z direction and confronts against the conductive member 17R with a space therebetween in the Z direction. The printed circuit board 17B is attached to an internal circumference of the wingding of one of the X-side swaying coils 22X while the conductive member 17R is attached to a side surface of a magnet piece 13 confronting against the one of the X-side swaying coils 22X which side surface being directed toward the back side with respect to the Z direction. That is, the Z direction which is the optical axis direction is regarded as an M direction while the Y direction is regarded as the N direction. These M and N directions are defined as an M(x) and an N(x) directions, respectively.

The coil 17C of the position detecting device 17X has a meander wiring part 17m, whose straight sections 17b are arranged so that they extend along the N(x) direction. Two edges 17f of the conductive member 17R are arranged so that they confront against the straight sections 17b of the coil 17C, viewing from the M(x) direction.

A coil 17C of the position detecting device 17Y is formed on the printed circuit board 17B whose plate surface is directed toward the Z direction and confronts against a conductive member 17R with a space therebetween in the Z direction. The printed circuit board 17B is attached to an internal circumference of the wingding of one of the Y-side swaying coils 22Y while the conductive member 17R is attached to a side surface of a magnet piece 13 confronting against the one of the Y-side swaying coils 22Y which side surface being directed toward the back side with respect to the Z direction. That is, the Z direction which is the optical axis direction is regarded as the M direction while the X direction is regarded as the N direction. These M and N directions are defined as an M(y) and an N(y) directions, respectively.

The coil 17C of the position detecting device 17Y has a meander wiring part 17m, whose straight sections 17b are arranged so that they extend along the N(y) direction. Two edges 17f of the conductive member 17R are arranged so that they confront against the straight sections 17b of the coil 17C, viewing from the M(y) direction.

In the position detecting device 17X, the conductive member 17R attached to the one of the magnet pieces 13 which are the movable pan moves toward the L(x) direction relative to the coil 17C in accordance with the movement of the magnet pieces 13. The edge 17f of the conductive member 17R accordingly moves toward the L(x) direction. Thus, the confronting area where the coil 17C and the conductive member 17R are confronted each other increases and decreases linearly in corresponding to the moving amount of the lens holder 14. Thus, the position detecting device 17 which is of small size and can accurately detect a predetermined length can be obtained.

Therefore, the lens 11 can be moved to an accurate position along the X direction which is orthogonal to the optical axis direction since an amount of power supply through the X-side swaying coils 22X is increased or decreased by being feedback controlled so that the inductance of the coil 17C is kept to a constant value.

In the position detecting device 17Y, the conductive member 17R attached to the one of the magnet pieces 13 which are the movable part moves toward the L(y) direction relative to the coil 17C in accordance with the movement of the magnet pieces 13. The edge 17f of the conductive member 17R accordingly moves toward the L(y) direction. Thus, the confonting area where the coil 17C and the conductive member 17R are confronted each other increases and decreases linearly in corresponding to the moving amount of the lens holder 14. Thus, the position detecting device 17 which is of small size and can accurately detect a predetermined length can be obtained.

Therefore, the lens 11 can be moved to an accurate position along the Y direction which is orthogonal to the optical axis direction since an amount of power supply through the Y-side swaying coils 22Y is increased or decreased by being feedback controlled so that the inductance of the coil 17C is kept to a constant value.

Especially, in the configuration employing the position detecting devices 17X, 17Y, the movement of the movable part toward the L(y) direction corresponds to the movement of the movable part toward the N(x) direction as for the position detecting device 17X. Therefore, the position detecting device 17X can accurately detect the moving amount of the movable part along the L(x) direction nevertheless of a movement of the movable part along the L(y) direction. Similarly, the position detecting device 17Y can accurately detect the moving amount of the movable part along the L(y) direction nevertheless of a movement of the movable part along the L(x) direction. Thus, even if the movable part moves toward any direction belonging to an X-Y plane, the position detecting device 17X can detect the moving amount only along the X direction nevertheless a moving amount along the Y direction. Further, the position detecting device 17Y can detect the moving amount only along the Y direction nevertheless a moving amount along the X direction.

Therefore, the lens 11 can be swayed at an accurate speed with respect to the X direction since an amount of power supply through the X-side swaying coils 22X is increased or decreased by being feedback controlled so that the inductance of the coil 17C of the X-side swaying coils 22X is kept to a constant value.

Further, the lens 11 can be swayed at an accurate speed with respect to the Y direction since an amount of power supply through the Y-side swaying coils 22Y is increased or decreased by being feedback controlled so that the inductance of the coil 17C of the Y-side swaying coils 22Y is kept to a constant value.

The present invention is thus described through the above embodiments. However, the technical scope of the present invention is not limited to the above described embodiments. It can also be obvious for a person skilled in the art to make various changes and modifications to the above embodiments. It can also be obvious from the scope of Claims that such the changes and the modifications to the embodiments are also included within the technical scope of the present invention.

The invention claimed is:

1. A position detecting device comprises:
a coil; and
a conductive member, wherein
the coil is attached to any one of a stator and a movable part which moves along a predetermined L direction with respect to the stator while the conductive member is attached to the other one of the stator and the movable part;
the coil is formed within a surface being directed so that an M direction orthogonal to the L direction coincides with the normal direction thereof and has a meander wiring part;
the meander wiring part has turning sections formed at ends thereof and turning width parts extending from the both ends of each turning section;
each turning width part has straight section extending in parallel to each other; and
the conductive member confronts against the coil with a predetermined space therebetween in the M direction, viewing from the M direction, an edge of the conductive member is configured to be confronted against the straight section of the meander wiring part and extended along the non-parallel direction with respect to the extending direction of the straight section and the L direction to traverse a plurality of straight sections.

2. A position detecting device according to claim 1, wherein the straight section extends along the same direction with the L direction, wherein the edge of the conductive member, with a movement of the movable part, confronts at the same position thereof against one of the plurality of straight sections.

3. A position detecting device according to claim 1, wherein the straight section extends along a different direction from the L direction, and the edge of the conductive member extends straightly.

4. A position detecting device according to claim 1, wherein the straight section extends along an N direction orthogonal to the L direction and the M direction; the conductive member has two edges traversing the plurality of straight sections; and a distance between the two edges along the N direction linearly changes with respect to the L direction.

5. A position detecting device according to claim 4, wherein the two edges extend straightly and are not in parallel to each other.

6. A position detecting device according to claim 1, wherein the turning sections are formed at both ends of the meander wiring part, wherein turning sections formed at at least one of the ends thereof do not confront against the conductive member.

7. A position detecting device according to claim 6, wherein an arranged direction of a plurality of the turning sections which are not confronted against the conductive member is approximately in parallel to an extending direction of the edge of the conductive member.

8. A position detecting device according to claim 1, wherein a varying inductance of the coil is detected whose inductance is changed by supplying an alternative current to the coil and thus generating an eddy current in the conductive member which confronts against the coil.

9. A lens driving device comprises:
at least one position detecting device each including:
a coil; and
a conductive member; wherein
the coil is attached to any one of a stator and a movable part which moves along a predetermined L direction with respect to the stator while the conductive member is attached to the other one of the stator and the movable part;
the coil is formed within a surface being directed so that an M direction orthogonal to the L direction coincides with the normal direction thereof and has a meander wiring part;
the meander wiring part has turning sections formed at ends thereof and turning width parts extending from the both ends of each turning section;
each turning width part has straight section extending in parallel to each other, and
the conductive member confronts against the coil with a predetermined space therebetween in the M direction, viewing from the M direction, an edge of the conductive member is configured to be confronted against the straight section of the meander wiring part and extended along the non-parallel direction with respect to the extending direction of the straight section and the L direction to traverse a plurality of straight sections; and wherein
the movable part includes a lens holder for supporting a lens;
the lens holder is configured that an optical axis direction of the lens is arranged in parallel to the L direction or the M direction; and
the position detecting device detects a position along a direction parallel or orthogonal to the optical axis direction of the movable part.

10. A lens driving device according to claim 9, wherein
the lens driving device including a first position detecting device and a second position detecting device as the position detecting device; wherein
the movable part is movable along an L1 direction and an L2 direction which are orthogonal to each other and which correspond to the L direction of the movable part;
the straight section of the first position detecting device extends along an N1 direction orthogonal to the L1 direction and the M direction while the straight section of the second position detecting device extends along an N2 direction orthogonal to the L2 direction and the M direction;
each of the conductive members of the first position detecting device and the second position detecting device has two edges traversing the plurality of straight sections; and
a distance between the two edges along the N1 direction or the N2 direction linearly changes with respect to the L1 direction or the L2 direction;
the lens holder is configured that an optical axis direction of the lens is arranged in parallel to the M direction;
the first position detecting device and the second position detecting device are arranged so that the L1 direction and the L2 direction are orthogonal to each other, and
the first position detecting device and the second position detecting device detect positions along directions which are orthogonal to the optical axis of the movable part and are orthogonal to each other.

11. A camera device comprises:
a lens driving device;
a lens; and
a photo detecting sensor receiving light passed through the lens; wherein
the lens driving device includes at least one position detecting device each including:
a coil; and
a conductive member; wherein
the coil is attached to any one of a stator and a movable part which moves along a predetermined L direction with respect to the stator while the conductive member is attached to the other one of the stator and the movable part;
the coil is formed within a surface being directed so that an M direction orthogonal to the L direction coincides with the normal direction thereof and has a meander wiring part;
the meander wiring part has turning sections formed at ends thereof and turning width parts extending from the both ends of each turning section;
each turning width part has straight section extending in parallel to each other, and
the conductive member confronts against the coil with a predetermined space therebetween in the M direction, viewing from the M direction, an edge of the conductive member is configured to be confronted against the straight section of the meander wiring part and extended along the non-parallel direction with respect to the extending direction of the straight section and the L direction to traverse a plurality of straight sections; and wherein
the movable part includes a lens holder for supporting the lens;
the lens holder is configured that an optical axis direction of the lens is arranged in parallel to the L direction or the M direction; and the position detecting device detects a position along a direction parallel or orthogonal to the optical axis direction of the movable part.

12. A camera device according to claim 11, wherein
the lens driving device including a first position detecting device and a second position detecting device as the position detecting device; wherein
the movable part is movable along an L direction and an L2 direction which are orthogonal to each other and which correspond to the L direction of the movable part;
the straight section of the first position detecting device extends along an N direction orthogonal to the L1 direction and the M direction while the straight section of the second position detecting device extends along an N2 direction orthogonal to the L2 direction and the M direction;
each of the conductive members of the first position detecting device and the second position detecting device has two edges traversing the plurality of straight sections; and
a distance between the two edges along the N1 direction or the N2 direction linearly changes with respect to the L1 direction or the L2 direction;
the lens holder is configured that an optical axis direction of the lens is arranged in parallel to the M direction;
the first position detecting device and the second position detecting device are arranged so that the L direction and the L2 direction are orthogonal to each other, and
the first position detecting device and the second position detecting device detect positions along directions which are orthogonal to the optical axis of the movable part and are orthogonal to each other.

13. An electronic apparatus being equipped with a camera device, the camera device includes:
a lens driving device;
a lens; and
a photo detecting sensor receiving light passed through the lens; wherein
the lens driving device includes at least one position detecting device each including:
a coil; and
a conductive member, wherein
the coil is attached to any one of a stator and a movable part which moves along a predetermined L direction with respect to the stator while the conductive member is attached to the other one of the stator and the movable part;
the coil is formed within a surface being directed so that an M direction orthogonal to the L direction coincides with the normal direction thereof and has a meander wiring part;
the meander wiring part has turning sections formed at ends thereof and turning width parts extending from the both ends of each turning section;
each turning width part has straight section extending in parallel to each other, and
the conductive member confronts against the coil with a predetermined space therebetween in the M direction, viewing from the M direction, an edge of the conductive member is configured to be confronted against the straight section of the meander wiring part and extended along the non-parallel direction with respect to the extending direction of the straight section and the L direction to traverse a plurality of straight sections; and wherein the movable part includes a lens holder for supporting the lens;

the lens holder is configured that an optical axis direction of the lens is arranged in parallel to the L direction or the M direction; and the position detecting device detects a position along a direction parallel or orthogonal to the optical axis direction of the movable part.

14. An electronic apparatus according to claim 13, wherein the lens driving device including a first position detecting device and a second position detecting device as the position detecting device; wherein the movable part is movable along an L1 direction and an L2 direction which are orthogonal to each other and which correspond to the L direction of the movable part;

the straight section of the first position detecting device extends along an N1 direction orthogonal to the L1 direction and the M direction while the straight section of the second position detecting device extends along an N2 direction orthogonal to the L2 direction and the M direction;

each of the conductive members of the first position detecting device and the second position detecting device has two edges traversing the plurality of straight sections; and a distance between the two edges along the N1 direction or the N2 direction linearly changes with respect to the L1 direction or the L2 direction;

the lens holder is configured that an optical axis direction of the lens is arranged in parallel to the M direction;

the first position detecting device and the second position detecting device are arranged so that the L direction and the L2 direction are orthogonal to each other; and the first position detecting device and the second position detecting device detect positions along directions which are orthogonal to the optical axis of the movable part and are orthogonal to each other.

* * * * *